(12) United States Patent
Loffink et al.

(10) Patent No.: US 7,586,211 B2
(45) Date of Patent: Sep. 8, 2009

(54) COST OPTIMIZED REDUNDANT POWER SUPPLY WITH DUAL AC INPUTS

(75) Inventors: John S. Loffink, Austin, TX (US); Brian P. Johnson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 11/336,095

(22) Filed: Jan. 20, 2006

(65) Prior Publication Data

US 2007/0170783 A1     Jul. 26, 2007

(51) Int. Cl.
*H02J 9/00*     (2006.01)
(52) U.S. Cl. ...................................................... 307/64
(58) Field of Classification Search .................. 307/23, 307/29, 51, 64, 65, 70, 80, 82; 363/69
See application file for complete search history.

(56) References Cited

U.S. PATENT DOCUMENTS

| | | | | |
|---|---|---|---|---|
| 4,638,175 A | * | 1/1987 | Bradford et al. ............... | 307/64 |
| 5,790,394 A | * | 8/1998 | Cabaniss et al. ............... | 363/65 |
| 5,939,802 A | * | 8/1999 | Hornbeck ...................... | 307/87 |
| 6,153,946 A | * | 11/2000 | Koch et al. ..................... | 307/64 |
| 6,297,978 B1 | | 10/2001 | Cronmiller et al. ............ | 363/67 |
| 6,356,470 B1 | * | 3/2002 | Sadler et al. ................... | 363/65 |
| 6,630,753 B2 | * | 10/2003 | Malik et al. .................... | 307/64 |
| 6,747,369 B2 | * | 6/2004 | Griffith et al. ................. | 307/43 |
| 7,020,790 B2 | | 3/2006 | Mares ......................... | 713/340 |
| 7,276,813 B2 | * | 10/2007 | Dobbs et al. ................... | 307/65 |
| 2007/0291519 A9 | * | 12/2007 | Sadler et al. ................... | 363/65 |

* cited by examiner

*Primary Examiner*—Robert L. Deberadinis
(74) *Attorney, Agent, or Firm*—Baker Botts L.L.P.

(57) ABSTRACT

A cost optimized redundant power supply consists of a plurality of power units (PUs) wherein each PU has two AC front ends. Each of the two AC front ends receive power from separate AC power sources, and each produce an isolated DC output. The isolated DC outputs from the two AC front ends are coupled to an input of one DC back end, e.g., DC-to-DC converter. Optimally, each of the AC front ends may have a power capacity of TRP/(N+1) and the DC back end may have a power capacity of TRP/N, where TRP=Total Redundant Power or the maximum system power required for operation and N is the number of PUs of the power supply.

16 Claims, 4 Drawing Sheets

Figure 2 (Prior Technology)

COST OPTIMIZED REDUNDANT POWER SUPPLY WITH DUAL AC INPUTS

TECHNICAL FIELD

The present disclosure relates generally to information handling systems and, more particularly, to a cost optimized redundant power supply for the information handling system.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system may be powered from a power supply that receives and converts alternating current (AC) power to direct current (DC) power at utilization voltages required by the electronic modules comprising the information handling system. The power supply tightly regulates these utilization voltages and incorporates over current protection for each of the voltages. To further provide increased reliability of the power supply, a plurality of power units (PUs) may be provided and coupled in parallel so that the loss or malfunction of one or more of the PUs will not totally disable operation of the information handling system. For critical applications the power supply may be powered from separate alternating current (AC) power sources, e.g., from independent utility power grids, so that the loss of primary power from one power source will not totally disable operation of the information handling system.

A power supply would require N+1 PUs for DC redundancy. For AC redundancy the power supply would require N+N PUs with N/2 of the PUs being connected to different independent AC power sources, e.g., each AC independent power source being supplied from a different power grid connection. Requiring N+N PUs for full AC redundancy is overkill compared to only needing N+1 PUs for DC redundancy.

Another issue is that a power supply in larger information handling systems, e.g., large server systems, blade server systems, etc., may reach or exceed the standard IEC connector limit which is about 2500 watts. Power requirements for a large information handling system may exceed 5000 watts. Therefore, a fully AC redundant power supply having N+N PUs will require a plurality of standard AC line cords connected to the N+N PUs. This is both expensive and wasteful because half of the power available is never used except in a fault condition. The N+N PU AC redundant system also is oversized in DC power capacity since only N+1 PUs are needed for DC redundancy.

SUMMARY

What is needed is a power supply having dual AC inputs that is cost optimized for both AC and DC redundancy, e.g., configuration and sizing of the AC and DC sections of the PUs of the dual AC input power supply. According to teachings of this disclosure, each PU may have two AC front ends (AC inputs) and a single DC back end (DC-to-DC converter output). The AC front end may include for example, but not limited to, an electromagnetic interference (EMI) filter, power factor correction (PFC) circuitry, e.g., PFC capacitors, and a circuit to convert AC to DC (voltage and current), e.g., rectifier. The DC back end may be a DC-to-DC converter having at least one DC output voltage, but is not limited to only a DC-to-DC converter.

According to a specific example embodiment of this disclosure, an apparatus for supplying redundant power may comprise a plurality of power units, each of the plurality of power units comprising: first and second alternating current (AC) front ends, and a direct current (DC) back end; an AC input of the first AC front end is adapted for connection to a first AC power source, and an AC input of the second AC front end is adapted for connection to a second AC power source; DC outputs of the first and second AC front ends are coupled to a DC input of the DC back end; and DC outputs of the DC back ends of the plurality of power units are coupled together for supplying DC power to a load.

According to another specific example embodiment of this disclosure, an information handing system may comprise a method for supplying redundant power, said method comprising the steps of: supplying a plurality of power units, each of the plurality of power units comprising first and second alternating current (AC) front ends, and a direct current (DC) back end, wherein DC outputs of the first and second AC front ends are coupled to a DC input of the DC back end; connecting an input of the first AC front end to a first AC power source; connecting an input of the second AC front end to a second AC power source; and connecting together DC outputs of the DC back ends of the plurality of power units for supplying DC power to a load.

According to still another specific example embodiment of this disclosure, an information handing system may comprise a plurality of subsystems; and a redundant power for powering the plurality of subsystems, wherein the redundant power supply comprises: a plurality of power units, each of the plurality of power units comprising: first and second alternating current (AC) front ends, and a direct current (DC) back end; an AC input of the first AC front end connected to a first AC power source, and an AC input of the second AC front end connected to a second AC power source; DC outputs of the first and second AC front ends are coupled to a DC input of the DC back end; and DC outputs of the DC back ends of the plurality of power units are coupled together for supplying DC power the plurality of subsystems.

BRIEF DESCRIPTION OF THE DRAWINGS

A more complete understanding of the present disclosure thereof may be acquired by referring to the following description taken in conjunction with the accompanying drawings wherein.

Figure 1:
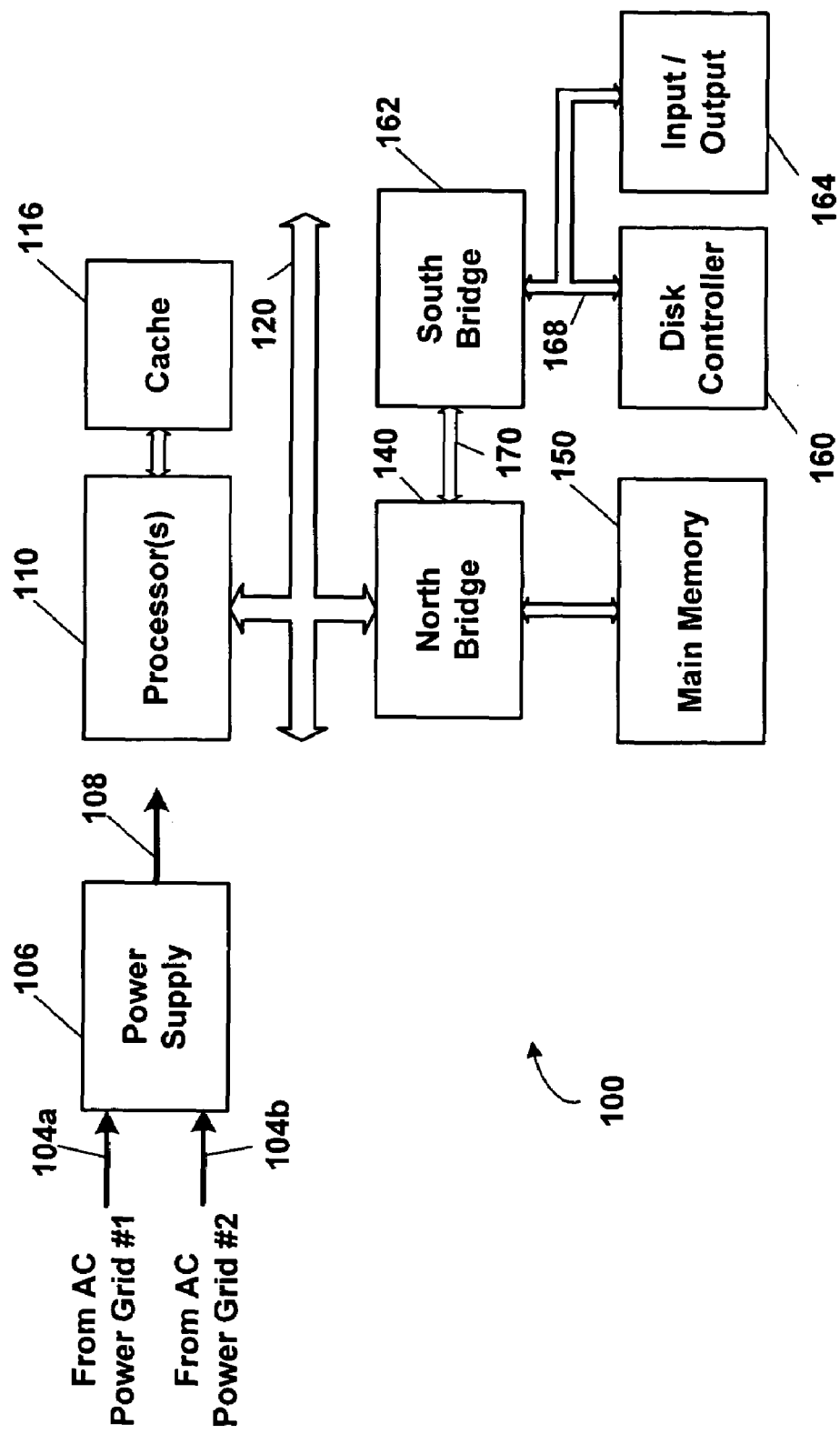
FIG. 1 is a schematic block diagram of an information handling system having electronic components mounted on at least one printed circuit board (PCB) (motherboard not shown) and communicating data and control signals therebetween over signal buses.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted a schematic block diagram of an information handling system having electronic components mounted on at least one printed circuit board (PCB) (motherboard not shown) and communicating data and control signals therebetween over signal buses. The information handling system, generally referenced by the numeral 100, may comprise one or more processors 110, a north bridge 140, which may also be referred to as a memory controller hub or a memory controller, and is coupled to a main system memory 150. The north bridge 140 is coupled to the processor(s) 110 via a host bus 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170. A third bus(es) 168 may also comprise other industry standard buses or proprietary buses, e.g., ISA, SCSI, $I^2C$, SPI, USB buses through a south bridge(s) (bus interface) 162. The above mentioned functional subsystems of the information handling system may be powered from a power supply system 106 having direct current (DC) output voltage(s) 108 coupled to the circuits making up the aforementioned subsystems. The power supply 106 may be coupled to two independent alternating current (AC) power sources 104a and 104b. The two independent power sources 104a and 104b may be used to insure high availability of the information handling system 100 for critical applications.

Figure 2:
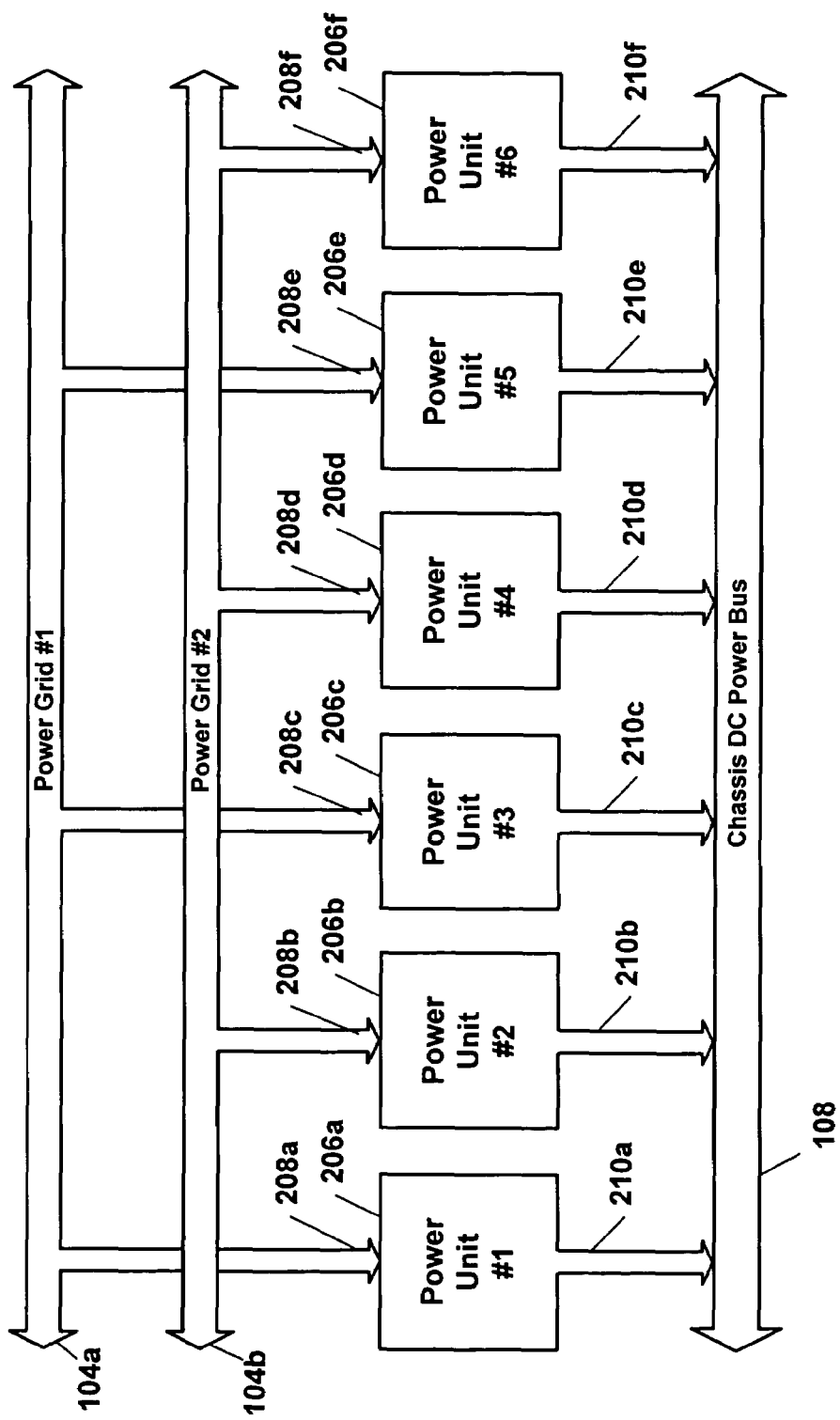
FIG. 2 is a schematic block diagram of a prior technology power supply coupled to two different AC power sources.

Referring now to FIG. 2, depicted a schematic block diagram of a prior technology power supply coupled to two different AC power sources. Each power unit (PU) 206 has an AC input 208 and a DC output 210. Alternate ones of the AC inputs 208 are connected to the AC power sources 104a and 104b, and the DC outputs 210 are connected to a DC power distribution bus 108. For example, an information handling system 100 has a power requirement of 6000 watts. For the fully AC redundant power supply shown in FIG. 2, each of the PUs 206 has to be capable of supplying 2000 watts but six of the PUs 206 are required in this configuration. Thus the power supply is oversized by 6000 watts (three of the PUs 206 are not used unless there is a major AC power failure). AC redundancy is excessively resource wasteful since only three PUs 206 are operationally required with one PU 206 as a DC standby spare.

Figure 3:
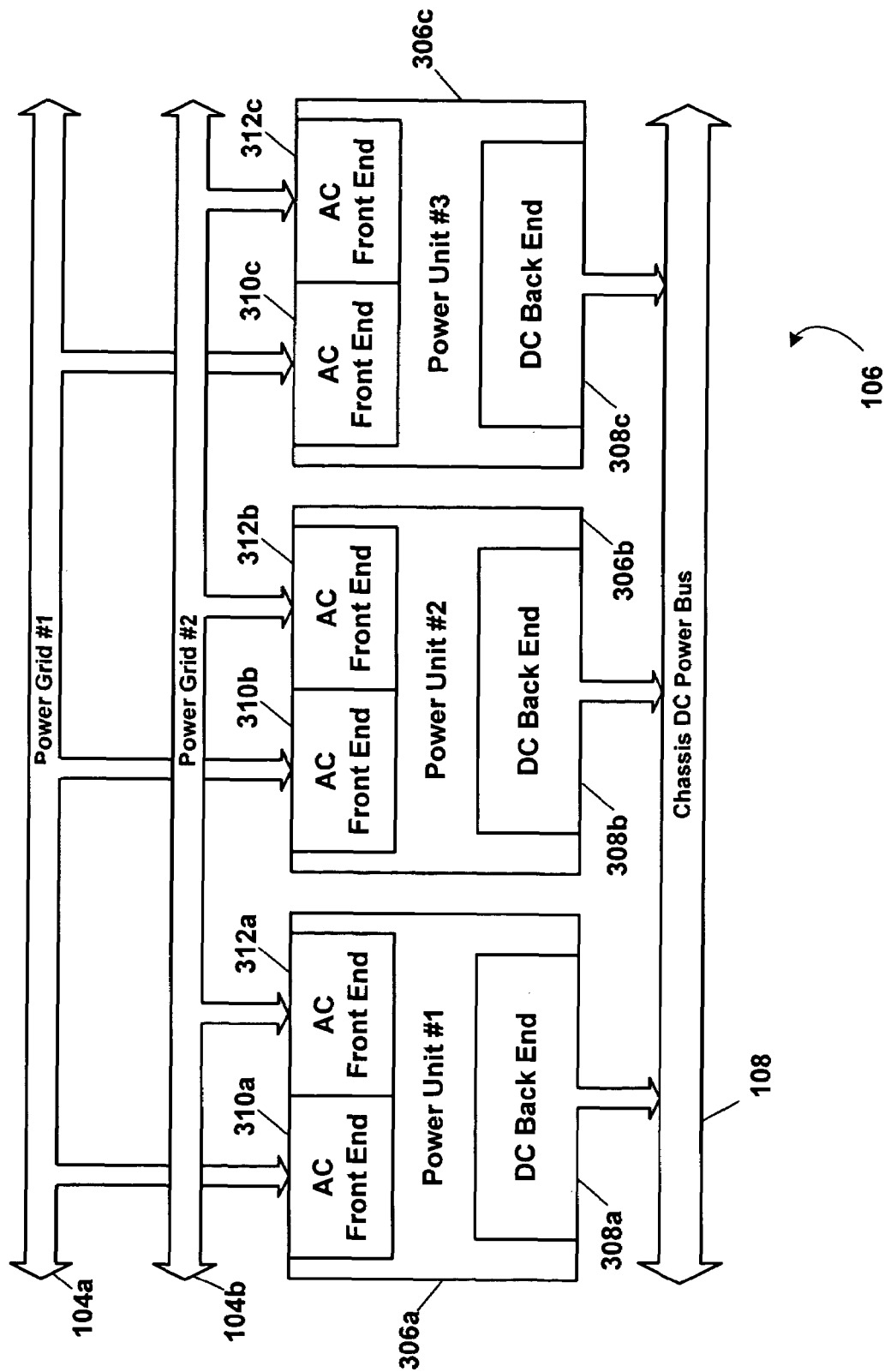
FIG. 3 is a schematic block diagram of a power supply coupled to two independent AC power sources, according to a specific example embodiment of the present disclosure.

Referring now to FIG. 3, depicted is a schematic block diagram of a power supply coupled to two independent AC power sources, according to a specific example embodiment of the present disclosure. Each of the PUs 306 may comprise two AC front ends 310 and 312, and one DC back end 308. Using a similar example of an information handling system 100 having a power requirement of 6000 watts, the power supply 106 shown in FIG. 3 may comprise three PUs 306, each capable of providing a DC power output of 3000 watts. Since only two of the PUs 306a and 306b are required for providing 6000 watts of DC power, the third PU 306c may be utilized as a DC redundant PU. Thus a 2+1 two AC input redundant power supply may require only 9000 watts of connected DC power capacity using three 3000 watt DC output PUs 306 to supply a normal operating power of 6,000 watts with an N+1 DC redundancy. Compared to the power supply shown in FIG. 2 having 12,000 watts of connected DC power capacity and requiring six 2000 watt PUs, three of which remain idle or under utilized until there is a PU or AC power source failure.

Further optimization of the power capacities for the AC front ends 310 and 312, and the DC back end 308 for each of the PUs 306 may be determined as follows: let TRP=Total Redundant Power needed or the maximum system power required for operation. For an N+1 PU redundant configuration each of the AC front ends 310 and 312 may be optimized by being substantially equal to TRP/(N+1). The DC back end 308 may be optimized by being substantially equal to TRP/N. Using the 6000 watt power requirement example above and three PUs 306, each of the AC front ends 310 and 312 may have a maximum power capacity of 2000 watts, and each DC back end 308 may have a maximum power capacity of 3000 watts.

Figure 4:
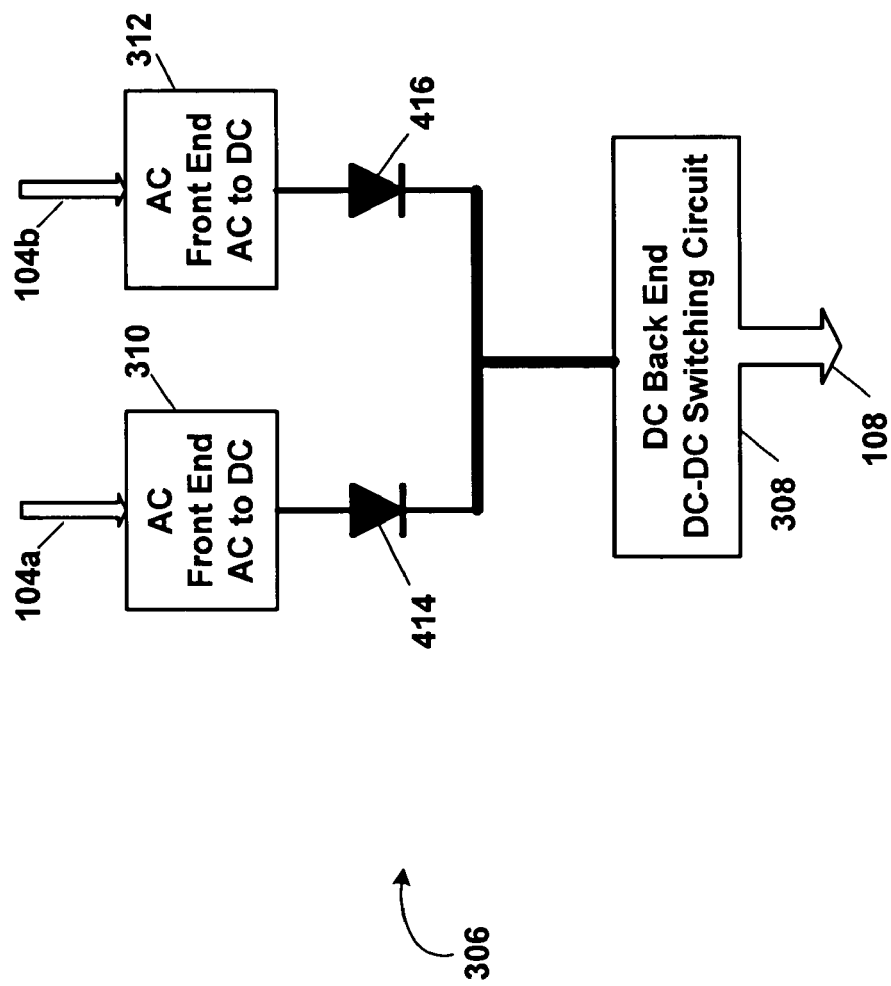
FIG. 4 is a more detailed schematic block diagram of a single power unit of the power supply illustrated in FIG. 3, according to a specific example embodiment of the present disclosure.

Referring now to FIG. 4, depicted is a more detailed schematic block diagram of a single power unit (PU 306) of the power supply system 106 illustrated in FIG. 3, according to a specific example embodiment of the present disclosure. The output of each of the AC front ends 310 and 312 may be substantially a DC voltage (rectification of the AC voltage input 104 to a DC voltage output). Isolation diodes 414 and 416 may be used to substantially prevent DC voltage and current (power) from back feeding from the output of an operational AC front end to a non-operational AC front end (isolation diodes 414 and 416 effectively block DC current flow in a reverse direction. Other isolation methods are contemplated herein and would be readily know by those having ordinary skill in power supply design.

From the example above for optimizing the AC front ends and DC back ends, each of the AC front ends 310 and 312 may have an available power capacity of approximately 2000 watts, e.g., TRP/(N+1), and each of the DC back ends may have an available power capacity of approximately 3000 watts, e.g., TRP/N, where TRP is 6000 watts (required load of the information handling system) and N is 3 (number of PUs 306 in the power supply 106). The AC voltage inputs 104a and 104b may be isolated from each other so that a failure of one of the power grids or AC distribution systems will only cause a loss of half of the AC front ends, either AC front ends 310 or 312, but not both. Thus, three of the AC front ends will still be receiving AC power and there will a total available power capacity of 3×2000 watts=6000 watts from the three operational AC front ends. The three DC back ends 308 will each have the ability to supply 2000 watts to the DC voltage (s) output 108 supplying the subsystems of the information handling system 100. The DC back ends 308 are limited in this configuration to the DC power available from the operational one of the connected AC front ends (2000 watts), but since there are three DC back ends 308 on line and available, 3×2000 watts=6000 watts, thus the redundant power supply 106 may still supply sufficient DC power to the information handling system 100.

If one of the DC back ends 308 should fail, and both AC front ends 310 and 312 are operational, then two of the DC back ends 308 may have the capacity to supply 2×3000 watts=6000 watts of available DC power to the information handling system 100. Since each of the DC back ends 308 is coupled to two operational AC front ends 310 and 312, and each of the AC front ends 310 and 312 has a DC power output capacity of 2000 watts, there is plenty of DC input power (2×2000 watts=4000 watts) available to adequately supply the 3000 watt capacity DC back end 308.

According to this disclosure, optimization based upon both AC and DC redundancy capacity requirements may provide the best overall cost and size solution for large redundant power supplies. It is contemplated and within the scope of this disclosure that more then two AC power sources may be utilized, e.g., three, four, etc., AC power sources, wherein each of the AC power sources will be connected to a respective one of a plurality AC front ends associated with a DC back end of each PU in a power supply having a plurality of PUs.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for supplying redundant power, comprising:
   a plurality of power units, each of the plurality of power units comprising:
      first and second alternating current (AC) front ends, and a direct current (DC) back end;
      an AC input of the first AC front end is adapted for connection to a first AC power source, and an AC input of the second AC front end is adapted for connection to a second AC power source;
      a DC output of the first AC front end and a DC output of the second AC front end are coupled to a DC input of the DC back end;
   DC outputs of the DC back ends of the plurality of power units are coupled together for supplying DC power to a load; and
   wherein each of the first and second AC front ends has an available power capacity of TRP/(N+1) and each of the DC back ends has an available power capacity of TRP/N, wherein TRP is total redundant power and N is the number of non-redundant power units, and wherein the number of non-redundant power units is the total number of power units in the plurality of power units less one.

2. The apparatus according to claim 1, wherein the DC outputs of the first and second AC front ends are isolated from each other.

3. The apparatus according to claim 2, wherein each DC output of the first and second AC front ends is coupled to the DC input of the DC back end with a diode.

4. The apparatus according to claim 1, wherein each of the first and second AC front ends comprises an AC-to-DC converter.

5. The apparatus according to claim 4, wherein each of the first and second AC front ends further comprises an electromagnetic interference (EMI) filter.

6. The apparatus according to claim 4, wherein each of the first and second AC front ends further comprises a power factor correction circuit.

7. The apparatus according to claim 1, wherein the DC back end is a DC-to-DC switching power converter.

8. The apparatus according to claim 1, wherein the DC back end supplies a plurality of DC output voltages.

9. The apparatus according to claim 1, wherein the load is at least one subsystem of an information handling system.

10. A method for supplying redundant power, said method comprising the steps of:

supplying a plurality of power units, each of the plurality of power units comprising first and second alternating current (AC) front ends, and a direct current (DC) back end, wherein a DC output of the first AC front end and a DC output of the second AC front end are coupled to a DC input of the DC back end, wherein each of the first and second AC front ends has an available power capacity of TRP/(N+1) and each of the DC back ends has an available power capacity of TRP/N, wherein TRP is total redundant power and N is the number of non-redundant power units, and wherein the number of non-redundant power units is the total number of power units in the plurality of power units less one;

connecting an input of the first AC front end to a first AC power source;

connecting an input of the second AC front end to a second AC power source; and connecting together DC outputs of the DC back ends of the plurality of power units for supplying DC power to a load.

11. The method according to claim 10, further comprising the step of isolating the DC outputs of the first and second AC front ends from each other.

12. The method according to claim 11, wherein each DC output of the first and second AC front ends is coupled to the DC input of the DC back end with a diode.

13. The method according to claim 10, further comprising the step of filtering electromagnetic interference (EMI) at each of the first and second AC front ends of the plurality of power units.

14. The method according to claim 10, further comprising the step of correcting power factor at each of the first and second AC front ends of the plurality of power units.

15. An information handling system, said system comprising:

a plurality of subsystems; and a redundant power for powering the plurality of subsystems, wherein the redundant power supply comprises:

a plurality of power units, each of the plurality of power units comprising:

first and second alternating current (AC) front ends, and a direct current (DC) back end;

an AC input of the first AC front end connected to a first AC power source, and an AC input of the second AC front end connected to a second AC power source, wherein each of the first and second AC front ends has an available power capacity of TRP/(N+1) and each of the DC back ends has an available power capacity of TRP/N, wherein TRP is total redundant power and N is the number of non-redundant power units, and wherein the number of non-redundant power units is the total number of power units in the plurality of power units less one;

a DC output of the first AC front end and a DC output of the second AC front end are coupled to a DC input of the DC back end; and DC outputs of the DC back ends of the plurality of power units are coupled together for supplying DC power the plurality of subsystems.

16. The information handling system according to claim 15, wherein the DC outputs of the first and second AC front ends are isolated from each other.

* * * * *